United States Patent
Iliadis et al.

(10) Patent No.: US 9,275,309 B2
(45) Date of Patent: Mar. 1, 2016

(54) SYSTEM AND METHOD FOR RAPID FACE RECOGNITION

(71) Applicant: TCL RESEARCH AMERICA INC., Santa Clara, CA (US)

(72) Inventors: Michael Iliadis, Santa Clara, CA (US); Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 104 days.

(21) Appl. No.: 14/449,352

(22) Filed: Aug. 1, 2014

(65) Prior Publication Data

US 2016/0034789 A1 Feb. 4, 2016

(51) Int. Cl.
*G06K 9/00* (2006.01)
*G06K 9/66* (2006.01)
*G06K 9/62* (2006.01)

(52) U.S. Cl.
CPC .............. *G06K 9/66* (2013.01); *G06K 9/00275* (2013.01); *G06K 9/00288* (2013.01); *G06K 9/6255* (2013.01)

(58) Field of Classification Search
None
See application file for complete search history.

(56) References Cited

U.S. PATENT DOCUMENTS

| | | | | |
|---|---|---|---|---|
| 7,949,186 B2* | 5/2011 | Grauman | ............ | G06K 9/4671 382/159 |
| 8,306,257 B2* | 11/2012 | Shiell | ............... | G06K 9/000275 348/169 |
| 8,311,319 B2* | 11/2012 | Shiell | ..................... | G06K 9/621 345/420 |
| 8,406,525 B2* | 3/2013 | Ma | ..................... | G06K 9/00275 382/159 |
| 8,457,409 B2* | 6/2013 | Lo | ......................... | G06K 9/6203 382/159 |
| 9,092,660 B2* | 7/2015 | Yamada | ............ | G06K 9/00268 |
| 9,213,899 B2* | 12/2015 | Mj | ..................... | G06K 9/00744 |
| 2010/0124377 A1* | 5/2010 | Yu | ........................ | G06K 9/6249 382/224 |
| 2011/0064302 A1* | 3/2011 | Ma | ..................... | G06K 9/00275 382/159 |
| 2012/0121142 A1* | 5/2012 | Nagesh | ............. | G06K 9/00288 382/118 |

FOREIGN PATENT DOCUMENTS

CN 103246870 A 8/2013

* cited by examiner

*Primary Examiner* — Chan Park
*Assistant Examiner* — Iman K Kholdebarin
(74) *Attorney, Agent, or Firm* — Anova Law Group, PLLC

(57) ABSTRACT

A face recognition method is provided to use sparse representation and regularized least squares-based classification on a computing device. The method includes obtaining an image to be recognized as a test sample y and a set of training images of certain subjects as training sample matrix T, obtaining a sparse representation of the test sample and the training samples including an initial estimation of a sparse vector a, and constructing a new face dictionary comprising training samples with non-zero corresponding coefficients in the sparse vector a for the initial estimation. The method also includes obtaining new coefficients by solving a regularized least squares problem based on the constructed new face dictionary, and determining a face identity of the test sample based on minimum class residual calculated by using the new coefficients.

20 Claims, 2 Drawing Sheets

SYSTEM AND METHOD FOR RAPID FACE RECOGNITION

FIELD OF THE INVENTION

The present invention relates to the field of image processing technology and, more particularly, to image systems and methods for recognizing human faces with improved speed and efficiency.

BACKGROUND

With the development of the computer and image processing technologies, face recognition is more and more used in security systems, interactive video applications, image editing and archiving applications, and computer vision applications, etc.

One challenging problem in face recognition is deducing a subject's identity through a provided image. Research efforts have been made on addressing practical large-scale face recognition systems in uncontrolled environments. Recently, face recognition via sparse representation-based classification (SRC) and its extensions may provide improved performance.

The SRC is based on the concept that a subject's face sample can be represented as a sparse linear combination of available images of the same subject captured under different conditions (e.g., poses, lighting conditions, etc.). The same principle can also be applied when a face image itself is represented in a lower dimensional space describing important and easily identifiable features. In order to enforce sparsity, $l_1$ optimization algorithms can be used. Then, the face class that yields the minimum reconstruction error is selected in order to classify or identify the subject.

However, the sparse representation based face recognition often assumes that the training images are carefully controlled and that the number of samples per class is sufficiently large. In order to overcome the limitation of requiring large amounts of samples per class, this disclosure uses a sparsity-based approach combined with additional, more informative, least-squares steps to provide significant performance improvements with little additional cost.

BRIEF SUMMARY OF THE DISCLOSURE

One aspect of the present disclosure includes a face recognition method using sparse representation and regularized least squares-based classification on a computing device. The method includes obtaining an image to be recognized as a test sample y and a set of training images of certain subjects as training sample matrix T, obtaining a sparse representation of the test sample and the training samples including an initial estimation of a sparse vector a, and constructing a new face dictionary comprising training samples with non-zero corresponding coefficients in the sparse vector a for the initial estimation. The method also includes obtaining new coefficients by solving a regularized least squares problem based on the constructed new face dictionary, and determining a face identity of the test sample based on minimum class residual calculated by using the new coefficients.

Another aspect of the present disclosure includes a non-transitory computer-readable medium having computer program. When being executed by a processor, the computer program performs a face recognition method using sparse representation and regularized least squares-based classification on a computing device. The method includes obtaining an image to be recognized as a test sample y and a set of training images of certain subjects as training sample matrix T, obtaining a sparse representation of the test sample and the training samples including an initial estimation of a sparse vector a for the initial estimation, and constructing a new face dictionary comprising training samples with non-zero corresponding coefficients in the sparse vector a. The method also includes obtaining new coefficients by solving a regularized least squares problem based on the constructed new face dictionary, and determining a face identity of the test sample based on minimum class residual calculated by using the new coefficients.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
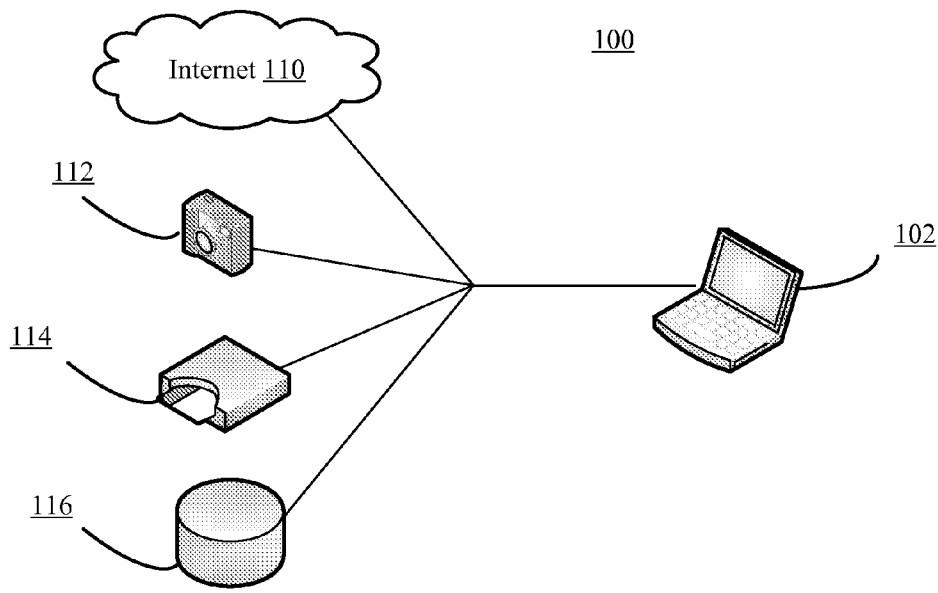
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a computing device 102, the Internet 110, a camera 112, a portable storage 114, and a data storage 116. Certain devices may be omitted and other devices may be added.

Computing device 102 may include any appropriate type of electronic device with computing capabilities, such as a television (TV), a set top box, a mobile phone, a smart phone, a tablet, a personal computer (PC), a server computer, a laptop computer, and a digital personal assistant (PDA), etc.

The Internet 110 may include any number of communication network and servers for providing various media for the computing device 102, such as streaming video, and photos and images, etc. Camera 112 may be an internal camera in the computing device 102 or may be an external camera connected to the computing device 102 over a network. Camera 112 may provide images and videos to the computing device 102.

Portable storage 114 may include any appropriate portable storage device for storing images or videos for the computing device 102, such as memory card, flash disk, and other type of removable storage media. Further, the data storage 116 may be an internal or external data storage device, such as a disk or a database for storing images or videos for the computing device 102.

Figure 2:
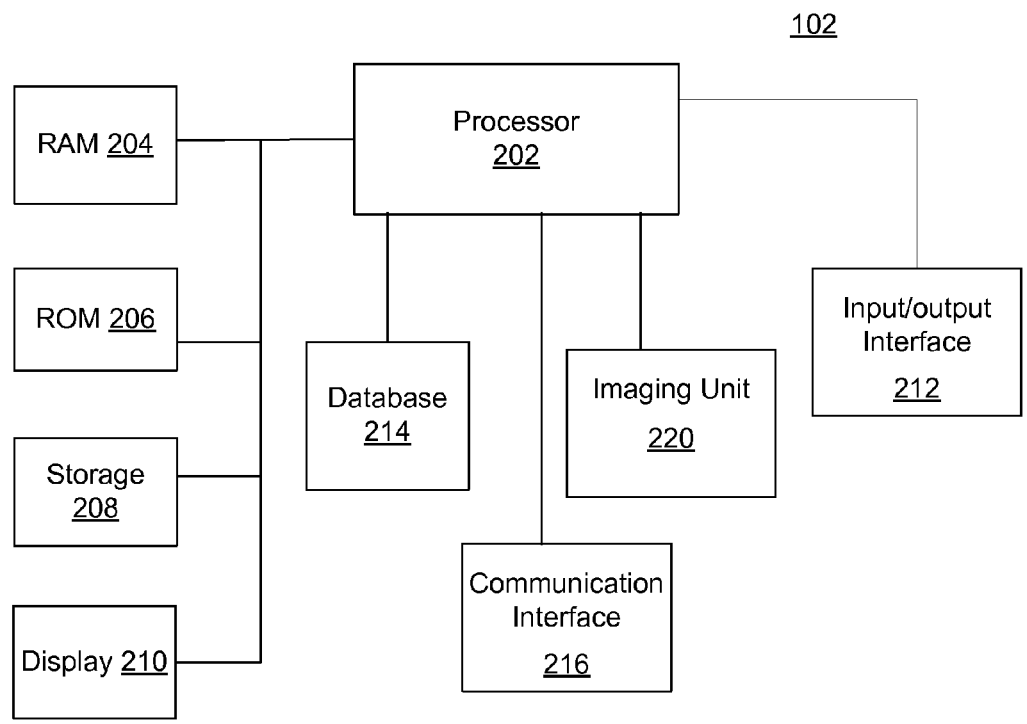
FIG. 2 illustrates an exemplary computing device consistent with the disclosed embodiments.

In operation, the computing device 102 may obtain images and/or videos from the camera 112, the portable storage 114, the data storage 116, and/or the Internet 110, and may perform certain image processing, such as face recognition, on the images and/or videos. FIG. 2 shows an exemplary block diagram of a computing device 102.

As shown in FIG. 2, computing device 102 may include a processor 202, a random access memory (RAM) unit 204, a read-only memory (ROM) unit 206, a storage unit 208, a display 210, an input/output interface unit 212, a database 214; a communication interface 216; and an imaging unit 220. Other components may be added and certain devices may be removed without departing from the principles of the disclosed embodiments.

Processor 202 may include any appropriate type of general purpose microprocessor, digital signal processor or microcontroller, and application specific integrated circuit (ASIC). Processor 202 may execute sequences of computer program instructions to perform various processes associated with computing device 102. The computer program instructions may be loaded into RAM 204 for execution by processor 202 from read-only memory 206, or from storage 208. Storage 208 may include any appropriate type of mass storage provided to store any type of information that processor 202 may need to perform the processes. For example, storage 208 may include one or more hard disk devices, optical disk devices, flash disks, or other storage devices to provide storage space.

Display 210 may provide information to a user or users of computing device 102. Display 210 may include any appropriate type of computer display device or electronic device display (e.g., CRT or LCD based devices). Input/output interface 212 may be provided for users to input information into computing device 102 or for the users to receive information from computing device 102. For example, input/output interface 212 may include any appropriate input device, such as a keyboard, a mouse, an electronic tablet, voice communication devices, or any other optical or wireless input devices. Further, input/output interface 212 may receive and/or send data from and/or to imaging unit 220.

Further, database 214 may include any type of commercial or customized database, and may also include analysis tools for analyzing the information in the databases. Database 214 may be used for storing image and graphic information and other related information. Communication interface 216 may provide communication connections such that computing device 102 may be accessed remotely and/or communicate with other systems through computer networks or other communication networks via various communication protocols, such as transmission control protocol/internet protocol (TCP/IP), hyper text transfer protocol (HTTP), etc. The imaging unit may include any appropriate image capturing, storage, and/or processing components, which is couple to or coincide with the processor 202.

During operation, the computing device 102 or, more particularly, processor 202 and/or the imaging unit 220 may perform certain processes to process images from various sources to identify the subject of interest and to provide further processing and applications. For example, the computing device 102 may play back a video and perform face recognition on the images in the video stream.

Figure 3:
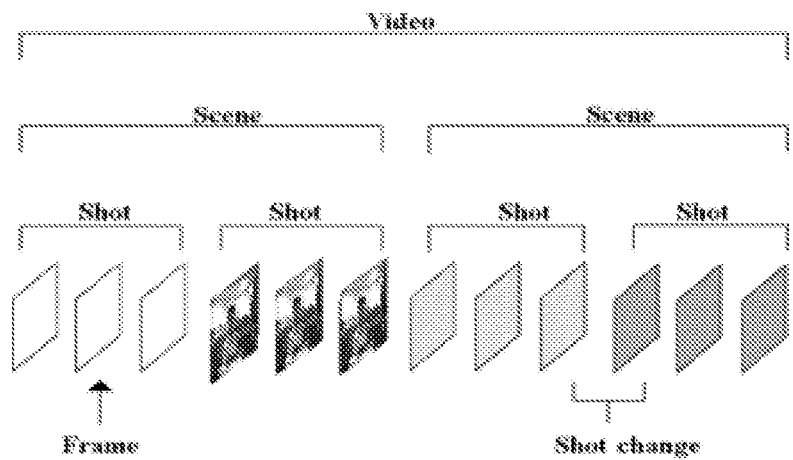
FIG. 3 illustrates an exemplary video structure consistent with the disclosed embodiments.

A video stream may be divided into different video components. As shown in FIG. 3, a video stream may be divided into scenes, a scene may be divided into shots, and a shot may be divided into frames. The frame can be further divided into objects and features of the video frame may be extracted for further processing. The face recognition may be performed on the objects to identify one or more preconfigured subject, i.e., person.

The face recognition may be performed using a classification algorithm based on sparse representation (SR) and regularized least squares (RLS). Several notations and calculations are used in face recognition algorithms based on sparse representation and regularized least squares.

Let $y \in \mathbb{R}^d$ denote the face test sample, where d is the dimensionality of a selected face feature and $T=[T_1, \ldots, T_c] \in \mathbb{R}^{d \times n}$ denote the matrix (dictionary) with the set of samples of c subjects stacked in columns. $T_i \in \mathbb{R}^{d \times n_i}$ denotes the $n_i$ set of samples of the $i^{th}$ subject, such that, $\Sigma_i n_i = n$.

In sparse representation-based classification (SRC), the test sample y can be represented by, $$y = Ta + e, \quad (1)$$

where $e \in \mathbb{R}^d$ is dense noise and $a \in \mathbb{R}^n$ is a sparse vector with nonzero elements corresponding to few samples in T. Thus, the test sample can be represented as a sparse linear combination of the samples in T. The coefficients of a can be estimated solving the optimization problem, $$a = \underset{a}{\operatorname{argmin}} \|y - Ta\|_2^2 + \lambda \|a\|_1. \quad (2)$$

In an extended sparse representation-based classification (ESRC), the test sample y can be represented by, $$y = Ta + Vb + e, \quad (3)$$

where $V \in \mathbb{R}^{d \times n}$ is a variation dictionary that models intra-class variant bases, such as, lighting changes, exaggerated expressions, or occlusions, for the representation of each subject i, while $a \in \mathbb{R}^n$ is a sparse vector, as in SRC.

Different types of variations, that cannot be captured by V, are represented by the dense noise term $e \in \mathbb{R}^d$. Vector $b \in \mathbb{R}^n$ is also considered to be sparse and its coefficients can effectively capture the contribution of uncontrolled viewing conditions in the final image and are, hence, not informative about the subject's identity.

Thus, the test sample is represented as the linear combination of Ta, capturing the subject's identity, and Vb, capturing sparse noise terms. The variation matrix V can be constructed by the differences of each sample to its corresponding class centroids.

$$V = [T_1 - m_1 r_1^T, \ldots, T_c - m_c r_c^T], \quad (4)$$

where $$m_i = \frac{1}{n_i} T_i r_i$$

is the centroid of class i, and $r_i = [1, \ldots, 1]^T \in \mathbb{R}^{n_i}$.

Further, in ESRC, the sparse vectors a and b can be obtained by solving optimization problem, $$a, b = \underset{a,b}{\operatorname{argmin}} \left\| y - [T, V] \begin{bmatrix} a \\ b \end{bmatrix} \right\|_2^2 - \lambda \left\| \begin{bmatrix} a \\ b \end{bmatrix} \right\|_1. \quad (5)$$

Similar to SRC, classification (or else subject identification) is performed by selecting the class i that provides the smallest residual. The difference is that in computing the residual of each class, the term Vb is also subtracted from the test sample.

Further, in a representation-based classification with regularized least squares (CR-RLS), a regularized least squares method to collaboratively represent the test sample without imposing sparsity constraints on the unknown variable a, classification is performed by minimizing the reconstruction term for each class. The optimization problem, of this very efficient method, is given by, $$a = \underset{a}{\operatorname{argmin}} \|y - Ta\|_2^2 + \lambda \|a\|_2^2, \quad (6)$$

which can be easily solved in closed form.

Figure 4:
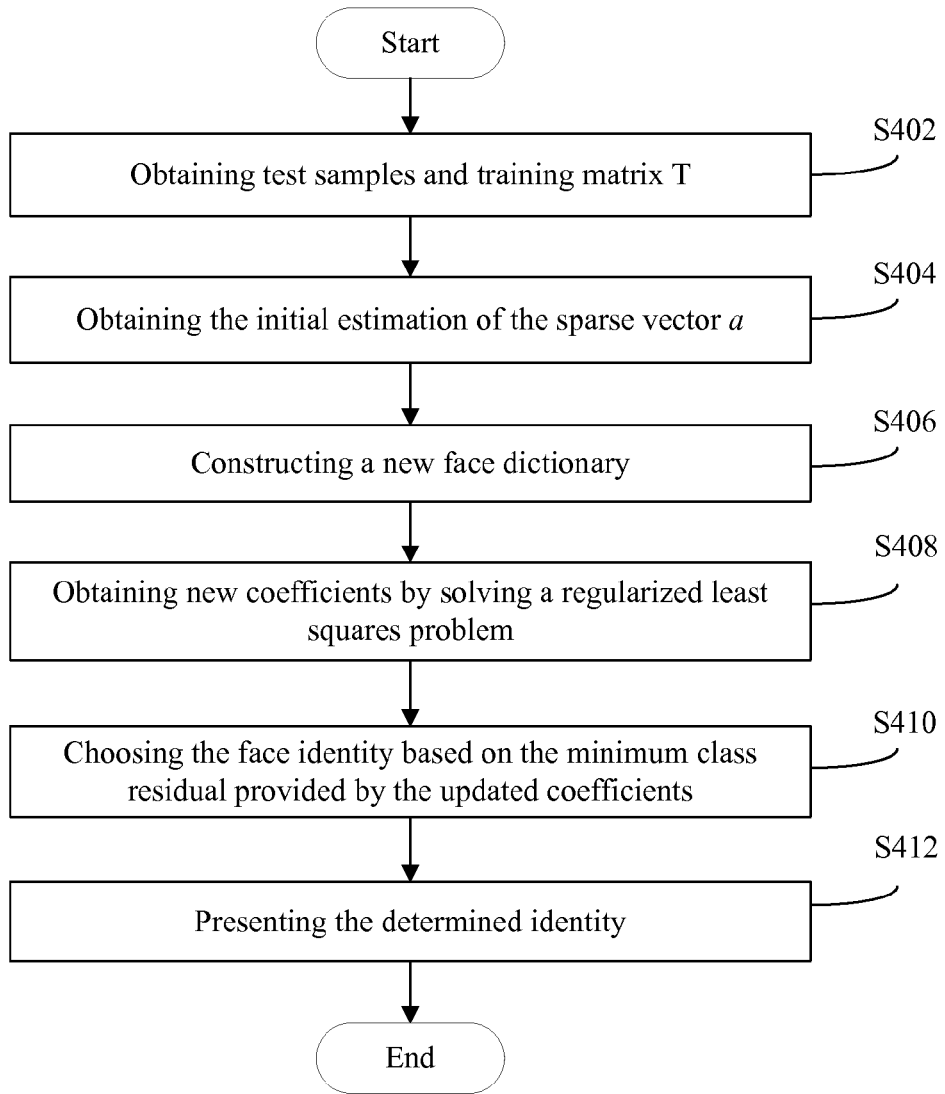
FIG. 4 illustrates an exemplary face recognition process consistent with the disclosed embodiments.

FIG. 4 shows an exemplary face recognition process based on sparse representation and regulated least squares-based classification (SR+RLS). As shown in FIG. 4, at the beginning, test samples and training matrix T are obtained (S402). The test sample and training matrix T can be obtained from various video sources based on the preconfigured subject(s).

For example, for a particular subject, various images of the subject may be obtained under different light conditions, occludations, viewing angles, surroundings, colors, image sizes, etc., as training samples. The test sample may be the image to be recognized. The obtained test samples and training matrix T may be stored on the computing device 102 (e.g., the storage 208).

The test samples, i.e., Vector y, may be obtained from video frames or from other images to be recognized, and training samples, i.e., matrix T, may be obtained from corresponding sources. The Vector y and matrix T are inputs to the SR+RLS face recognition algorithm.

Further, a principal component analysis (PCA) may be performed on the training samples T to project T onto a d dimensional space, i.e., the selected face feature dimensions. Also, the columns of T may be normalized to have unit $l_2$-norm.

Further, a sparse representation (SR) is obtained (S404). That is, the initial estimation of the sparse vector a is obtained by, for example, solving the optimization problem in equation (2) or (6).

More specifically, in order to obtain the initial estimation of the sparse vector a, two different optimization problems may be used, (a) a standard sparse coding problem using any $l_1$ minimization algorithm, or (b) an approximated sparse coding problem where a least squares problem is first solved and then using a threshold to suppress most values to zero.

When the standard sparse coding problem is used, i.e., the $l_1$ minimization algorithm, the initial estimation of a may be solved by the problem in equation (2). Using this approach, although the accuracy of the estimation of a can be desired, the computational complexity may be significantly high.

In certain embodiments, especially when in real-time scenarios, the initial estimation of a may be solved by the problem in equation (6). Using this approach, the computational complexity is significantly lower (near zero). However, equation (6) may be an approximated version of the sparse code a. To better approximate the sparse code a, most values of the least squares solution may be suppressed to zero, either by using a threshold or decided of the percentage of the nonzero coefficients of a to be kept.

The user may configure the computing device 102 to determine when and/or whether to use the equation (2) or the equation (6). For example, for real-time applications, such as streaming video, equation (6) may be used as to reduce computational complexity. On the other hand, for static image application, equation (2) may be used as to increase accuracy. The computing device 102 may also automatically determine whether to use the equation (2) or the equation (6) based on computational load or other types of performance related criteria.

After the initial estimation of the sparse vector a is obtained (S404), a new face dictionary is constructed (S406). The new face dictionary may consist of the training samples of the classes whose corresponding coefficients in a are nonzero, while the remaining sets of training samples for all other classes are nullified (set to zero). Because the new face dictionary may include faces similar to test samples (e.g., more accurate faces), noise training samples from initial face dictionary may be removed and desired coefficients can obtained or estimated by solving a regularized least squares problem based on the new face dictionary.

More specifically, let the function $f(a_i)$, where $a_i$ is the segment of a associated with class i, be given as, $$f(a_i) = \begin{cases} 0, & \text{if } a_i = 0 \\ 1, & \text{otherwise} \end{cases} \quad (7)$$

Then the new dictionary T is constructed as follows, $$T = [f(a_i) \times T_i, \ldots, f(a_c) \times T_c] \in \mathbb{R}^{d \times n} \quad (8)$$

where × denotes the convolution operator.

After the dictionary is constructed, new coefficients can obtained or estimated by solving a regularized least squares problem (S408).

For example, after constructing the new dictionary with most training samples suppressed to zero, a new estimation vector can be obtained by solving the regularized least squares (RLS) problem:

$$f = \underset{f}{\operatorname{argmin}} \|y - Tf\|_2^2 + \lambda \|f\|_2^2. \quad (9)$$

The problem in (9) has the closed form solution, $$f = (T^T T + \lambda 1)^{-1} T^T y, \quad (10)$$

where $f \in \mathbb{R}^n$ is the vector with nonzero coefficients only at locations where the training samples are not zero, and $\lambda > 0$ is a constant.

The solution to problem (9) may be desired, because this RLS step is more likely to provide the true identity of the subject since fewer classes are reconstructed and thus less noise. Also, $f$ may have larger coefficient values corresponding to the true identity training samples compared to the initial estimate a. Further, the problem in (9) is well-defined since T is expected to consist of fewer (nonzero) columns than rows. Thus, no significant complexity is added to the solution because the least squares step in (10) can be solved very efficiently.

Further, the face identity can be chosen based on the minimum class residual provided by the updated coefficients (S410).

The residuals for each class i may be calculated as, $$e_i(y) = \|y - T_i f_i\|_2,$$

where $f_i$ is the coding coefficient vector associated with class i.

Thus, the identity of the test sample y can be determined as, $$\text{Identity}(y) = \underset{i}{\operatorname{argmin}} \{e_i\}.$$

After the identity is determined (S410), the identity is presented to the user or to other application programs (S412).

For example, the user may be prompted with the identity of the subject in the video, or the identity of the subject in the video may be provided to an application program and the application program may alert the user of certain events, such as to alert the user of its favorite show, or a security situation, etc.

Thus, according to disclosed embodiments, a sparse representation with the regularized least squares classification (SR+RLS) algorithm may be performed to classify the face identity. Such approach may overcome the need for a large number of training images since it proves robust to varying number of training samples.

Thus, by using the disclosed systems and methods, improved face recognition applications can be provided in video and image applications. The disclosed systems and methods effectively combine sparse representation and regularized least squares-based classification in the face recognition applications. A simple additional least squares step in the optimization procedure can provide significant performance improvement at near-zero cost while being robust to varying numbers of training samples in the dictionary.

Further, the disclosed two-stage approach face recognition methods are more advantageous in terms of face recognition precision compared with one-stage approach. Other applications, advantages, alternations, modifications, or equivalents to the disclosed embodiments are obvious to those skilled in the art.

What is claimed is:

1. A face recognition method using sparse representation and regularized least squares-based classification on a computing device, the method comprising:
    obtaining an image to be recognized as a test sample y and a set of training images of certain subjects as training sample matrix T;
    obtaining a sparse representation of the test sample and the training samples including an initial estimation of a sparse vector a;
    constructing a new face dictionary comprising training samples with non-zero corresponding coefficients in the sparse vector a for the initial estimation;
    obtaining new coefficients by solving a regularized least squares problem based on the constructed new face dictionary; and
    determining a face identity of the test sample based on minimum class residual calculated by using the new coefficients.

2. The face recognition method according to claim 1, further including:
    presenting the face identity of the test sample to a user of the computing device.

3. The face recognition method according to claim 1, further including:
    determining whether to use a standard sparse coding optimization problem or to use an approximated sparse coding optimization problem to obtain the initial estimation of the sparse vector a,
    wherein the standard sparse coding optimization problem uses an $l_1$ minimization algorithm and the approximated sparse coding optimization problem requires that a least squares problem is first solved and a threshold is used to suppress most values to zero.

4. The face recognition method according to claim 3, wherein:
    the test sample y is represented as a sparse linear combination of samples in T as:
    y=Ta+e, wherein $e \in \mathbb{R}^d$ is dense noise and $a \in \mathbb{R}^n$ is the sparse vector with nonzero elements corresponding to few samples in T.

5. The face recognition method according to claim 4, wherein:
    when the standard sparse coding optimization problem is used, the coefficients of the sparse vector a is estimated by solving the sparse coding optimization problem by $$a = \mathrm{argmin}_{a} \|y - Ta\|_2^2 + \lambda \|a\|_1.$$

6. The face recognition method according to claim 4, wherein:
    when the approximated sparse coding optimization problem is used, the coefficients of the sparse vector a is estimated by solving the approximated sparse coding optimization problem by $$a = \mathrm{argmin}_{a} \|y - Ta\|_2^2 + \lambda \|a\|_2^2.$$

7. The face recognition method according to claim 1, wherein constructing the new face dictionary further includes:
    provided the function $f(a_i)$, where $a_i$ is the segment of a associated with class i, be given as $$f(a_i) = \begin{cases} 0, & \text{if } a_i = 0 \\ 1, & \text{otherwise} \end{cases},$$

constructing the new dictionary T as $T=[f(a_1) \times T_1, \ldots, f(a_c) \times T_c] \in \mathbb{R}^{d \times n}$, wherein × denotes a convolution operator.

8. The face recognition method according to claim 7, wherein obtaining the new coefficients further includes:
    obtaining new estimation vector can be obtained by solving the regularized least squares (RLS) problem $$f = \mathrm{argmin}_{f} \|y - Tf\|_2^2 + \lambda \|f\|_2^2,$$

which has a closed form solution of $f=(T^T T + \lambda 1)^{-1} T^T y$, where $f \in \mathbb{R}^n$ is a vector with nonzero coefficients only at locations where the training samples are not zero, and $\lambda > 0$ is a constant.

9. The face recognition method according to claim 8, wherein:
    the minimum class residual of each class i is calculated as $e_i(y) = \|y - T_i f_i\|_2$, wherein $f_i$ is the coding coefficient vector associated with class i; and
    the face identity of the test sample y is determined as Identity(y)=argmin$_i\{e_i\}$.

10. The face recognition method according to claim 2, wherein presenting the face identity further includes:
    alerting the user of one or more events based on the face identity.

11. A non-transitory computer-readable medium having computer program for, when being executed by a processor, performing a face recognition method using sparse representation and regularized least squares-based classification on a computing device, the method comprising:
    obtaining an image to be recognized as a test sample y and a set of training images of certain subjects as training sample matrix T;

obtaining a sparse representation of the test sample and the training samples including an initial estimation of a sparse vector a;

constructing a new face dictionary comprising training samples with non-zero corresponding coefficients in the sparse vector a for the initial estimation;

obtaining new coefficients by solving a regularized least squares problem based on the constructed new face dictionary; and determining a face identity of the test sample based on minimum class residual calculated by using the new coefficients.

12. The non-transitory computer-readable medium according to claim 11, the method further including:

presenting the face identity of the test sample to a user of the computing device.

13. The non-transitory computer-readable medium according to claim 11, the method further including:

determining whether to use a standard sparse coding optimization problem or to use an approximated sparse coding optimization problem to obtain the initial estimation of the sparse vector a, wherein the standard sparse coding optimization problem uses an $l_1$ minimization algorithm and the approximated sparse coding optimization problem requires that a least squares problem is first solved and a threshold is used to suppress most values to zero.

14. The non-transitory computer-readable medium according to claim 13, wherein:

the test sample y is represented as a sparse linear combination of samples in T as:

y=Ta+e, wherein $e \in \mathbb{R}^d$ is dense noise and $a \in \mathbb{R}^n$ is the sparse vector with nonzero elements corresponding to few samples in T.

15. The non-transitory computer-readable medium according to claim 14, wherein:

when the standard sparse coding optimization problem is used, the coefficients of the sparse vector a is estimated by solving the sparse coding optimization problem by $$a = \arg\min_{a} \|y - Ta\|_2^2 + \lambda \|a\|_1.$$

16. The non-transitory computer-readable medium according to claim 14, wherein:

when the approximated sparse coding optimization problem is used, the coefficients of the sparse vector a is estimated by solving the approximated sparse coding optimization problem by $$a = \arg\min_{a} \|y - Ta\|_2^2 + \lambda \|a\|_2^2.$$

17. The non-transitory computer-readable medium according to claim 11, wherein constructing the new face dictionary further includes:

provided the function $f(a_i)$, where $a_i$ is the segment of a associated with class i, be given as $$f(a_i) = \begin{cases} 0, & \text{if } a_i = 0 \\ 1, & \text{otherwise} \end{cases},$$

constructing the new dictionary T as T=$[f(a_i) \times T_i, \ldots, f(a_c) \times T_c] \in \mathbb{R}^{d \times n}$, wherein $\times$ denotes a convolution operator.

18. The non-transitory computer-readable medium according to claim 17, wherein obtaining the new coefficients further includes:

obtaining new estimation vector can be obtained by solving the regularized least squares (RLS) problem $$f = \arg\min_{f} \|y - Tf\|_2^2 + \lambda \|f\|_2^2.$$

which has a closed form solution of $f=(T^T T+\lambda 1)^{-1}T^T y$, where $f \in \mathbb{R}^n$ is a vector with nonzero coefficients only at locations where the training samples are not zero, and $\lambda > 0$ is a constant.

19. The non-transitory computer-readable medium according to claim 18, wherein:

the minimum class residual of each class i is calculated as $e_i(y)=\lambda y-T_i f_i\|_2$, wherein $f_i$ is the coding coefficient vector associated with class i; and the face identity of the test sample y is determined as Identity(y)=$\arg\min_i \{e_i\}$.

20. The non-transitory computer-readable medium according to claim 12, wherein presenting the face identity further includes:

alerting the user of one or more events based on the face identity.

* * * * *